United States Patent [19]
Shimizu et al.

[11] Patent Number: 5,172,298
[45] Date of Patent: Dec. 15, 1992

[54] ELECTROMAGNETIC ACTUATOR

[75] Inventors: Motohiro Shimizu, Saitama; Yoh-ichi Kaneko, Tokyo; Toshikazu Nakamura, Saitama, all of Japan

[73] Assignee: Honda Giken Kogyo Kabushiki Kaisha, Tokyo, Japan

[21] Appl. No.: 638,789

[22] Filed: Jan. 8, 1991

[30] Foreign Application Priority Data

Jan. 9, 1990 [JP] Japan .................................. 2-2123
Jan. 9, 1990 [JP] Japan .................................. 2-2124

[51] Int. Cl.$^5$ .................................................. H01H 47/00
[52] U.S. Cl. ........................................ 361/152; 361/142; 361/203; 324/207.16; 324/207.26
[58] Field of Search ...................... 324/207.15, 207.16, 324/207.26, 324, 326; 331/65; 361/139, 142, 143, 152, 160, 170, 185, 186, 187, 203

[56] References Cited

U.S. PATENT DOCUMENTS

| 4,507,610 | 3/1985 | Nakaoka ........................ 324/237 |
| 4,816,759 | 3/1989 | Ames et al. ..................... 324/236 |
| 4,954,776 | 9/1990 | Husher .......................... 324/207.16 |

FOREIGN PATENT DOCUMENTS 1-25305  5/1989  Japan.

Primary Examiner—Jeffrey A. Gaffin
Attorney, Agent, or Firm—Irving M. Weiner; Joseph P. Carrier; Pamela S. Burt

[57] ABSTRACT

An electromagnetic actuator for use with a fuel injection pump, for example, has a position detector for detecting the operating position of a plunger which is axially movable. The electromagnetic actuator includes a core mounted on one end of the plunger, a drive coil disposed around the plunger and energizable to displace the plunger axially under magnetic forces, a detection coil disposed closely to the drive coil coaxially therewith, for receiving the core therein in response to axial displacement of the plunger, whereby the inductance of the detection coil can vary depending on the length of the portion of the core which is positioned within the detection coil, an LC oscillator including an inductor and a capacitor, for producing an alternating current whose frequency is determined by the inductance of the inductor and the electrostatic capacitance of the capacitor, the detection coil being at least part of the inductor, whereby the oscillation frequency of the LC oscillator varies as the inductance of the detection coil varies, and a frequency-to-voltage converter for converting the frequency of an output signal from the LC oscillator into a corresponding DC voltage signal which is indicative of an operating positon of the plunger. The electromagnetic actuator is small in size and capable of actuating the fuel injection pump under accurate control.

13 Claims, 2 Drawing Sheets

1

ELECTROMAGNETIC ACTUATOR

BACKGROUND OF THE INVENTION

1. Field of the Invention

The present invention relates to an electromagnetic actuator suitable for use in fuel injection devices for internal combustion engines, and more particularly to an electromagnetic actuator having a position detector for detecting the operating position of a plunger.

2. Description of the Relevant Art

Conventional electromagnetic actuators have a position detector for detecting the operating position of a plunger. The position detector comprises a sensor core mounted on the tip end of the plunger which is axially movable under magnetic forces generated by a drive coil, and a differential transformer comprising primary and secondary coils for detecting the displacement of the sensor core.

Since the position of the plunger is detected by the differential transformer, the differential transformer should not be adversely affected by the magnetic field produced by the drive coil for a higher degree of detecting accuracy. Therefore, the differential transformer and the drive coil must be widely spaced apart, making the position detector large in size.

According to a solution proposed in Japanese Patent Publication No. 1(1989)-25305, the sensor core is made of a nonmagnetic electrically conductive material, and the primary coil of the differential transformer is supplied with a high-frequency current to render the differential transformer less susceptible to the magnetic field, the differential transformer being coaxially disposed in the drive coil.

The proposed position detector is however complex in structure because the differential transformer is housed in the drive coil. Use of the differential transformer to detect the position of the plunger requires that a compensating coil be added to effect detector output adjustments for setting a signal at a reference plunger position to a predetermined value. It is therefore necessary to assemble the compensating coil as well as the exciting primary coil and the detecting secondary coil. Furthermore, an electric circuit associated with the differential transformer is complex.

SUMMARY OF THE INVENTION

It is an object of the present invention to provide an electromagnetic actuator which is small in size but assures a high degree of accuracy with which the operating position of a plunger is detected, and which allows the output of a position detector to be finely adjusted with a relatively simple electric circuit.

According to the present invention, there is provided an electromagnetic actuator comprising an axially movable plunger, a core mounted on one end of the plunger, a drive coil disposed around the plunger and energizable to displace the plunger axially under magnetic forces, a detection coil disposed closely to the drive coil coaxially therewith, for receiving the core therein on one side thereof in response to axial displacement of the plunger, whereby the inductance of the detection coil can vary depending on the length of the portion of the core which is positioned within the detection coil, an LC oscillator including an inductor and a capacitor, for producing an alternating current whose frequency is determined by the inductance of the inductor and the electrostatic capacitance of the capacitor, the detection coil being at least part of the inductor, whereby the oscillation frequency of the LC oscillator varies as the inductance of the detection coil varies, and a frequency-to-voltage converter for converting the frequency of an output signal from the LC oscillator into a corresponding DC voltage signal which is indicative of an operating position of the plunger.

When the core mounted on the plunger is axially displaced, the inductance of the detection coil positioned closely to the drive coil varies, thereby varying the oscillation frequency of the LC oscillator. The frequency of the output signal from the LC oscillator is converted by the F/V converter into the voltage signal which represents the operating position or displacement of the plunger. The electromagnetic actuator is relatively simple in structure since the common core is used to drive the plunger and also detect the position of the plunger. Though the detection coil is positioned near the drive coil for the detection of the position of the plunger, the position of the plunger can be detected accurately without being adversely affected by the magnetic field produced by the drive coil.

The electromagnetic actuator also includes an output adjustment core disposed on a side of the detection coil opposite to said one side and variable in position axially of the plunger so that the output adjustment core is positionable at least partly in the detection coil, whereby the inductance of the detection coil can vary depending on the length of the portion of the output adjustment core which is positioned within the detection coil. The detected signal, indicative of the position of the plunger, can be finely adjusted by adjusting the position of the output adjustment core with respect to the detection coil, thus varying the inductance of the detection coil. Since the magnetic circuit of the detection coil is utilized for such output signal adjustments, no special electric circuit is necessary for output signal adjustments.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
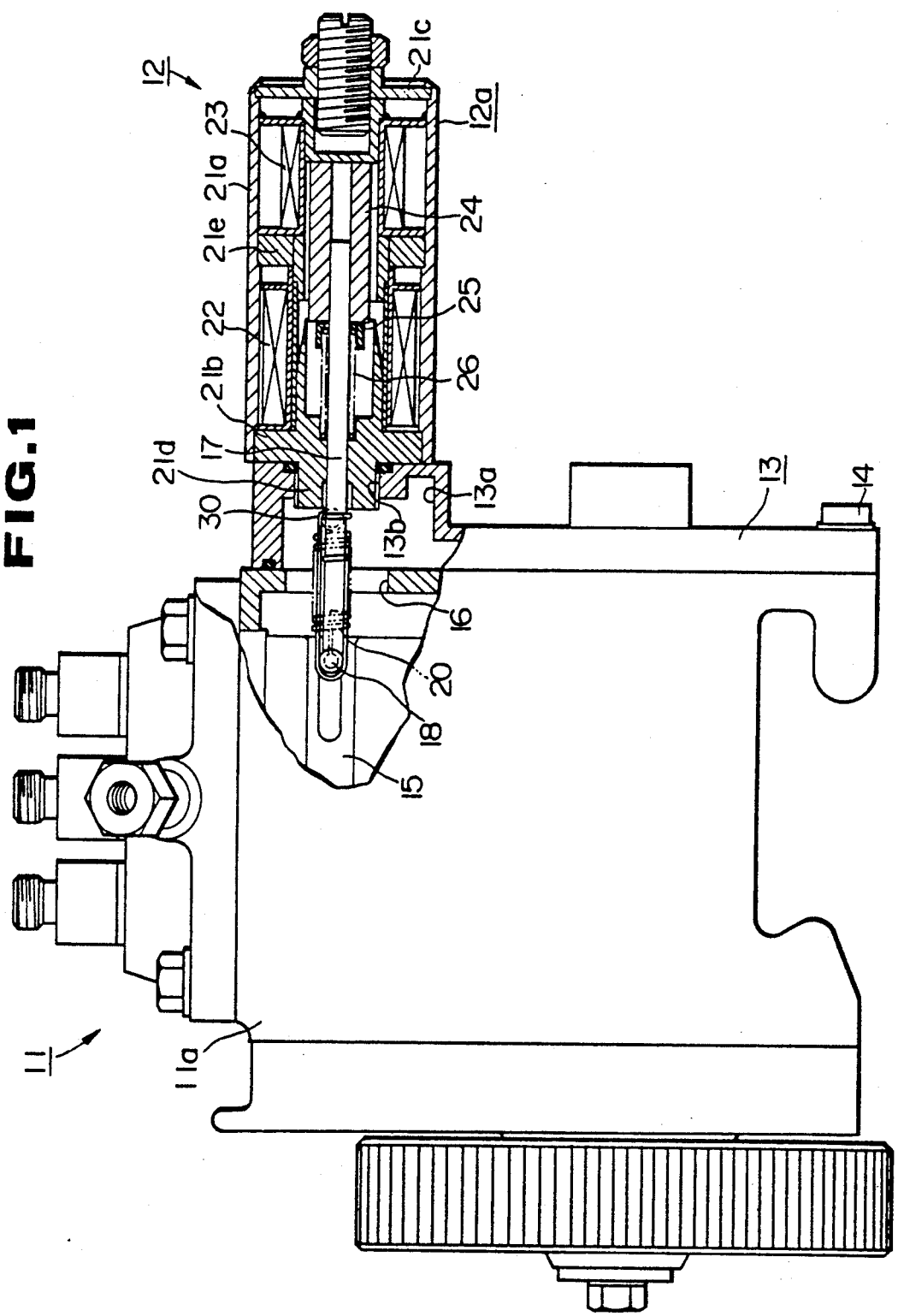
FIG. 1 is a cross-sectional view of an electromagnetic actuator according to the prevent invention, the electromagnetic actuator being combined with a fuel injection device.

As shown in FIG. 1, a fuel injection pump 11, which is of the conventional type for supplying fuel to a diesel engine, has a control rack 15 that is axially displaceable to vary the rate at which fuel is delivered from the fuel injection pump 11. Fuel which is delivered under high pressure from the fuel injection pump 11 at predetermined intervals of time is injected from fuel injection nozzles (not shown) into cylinders of the diesel engine.

An electromagnetic actuator 12 is connected to the fuel injection pump 11 by a bracket 13. The bracket 13 has a lefthand end (as viewed in FIG. 1) fastened by a bolt 14 to a housing 11a of the fuel injection pump 11. The bracket 13 has an upper coupling 13a defining an attachment hole 13b therein. The attachment hole 13b is held coaxially with the control rack 15 of the fuel injection pump 11 and also a plunger 17 of the electromagnetic actuator 12. The electromagnetic actuator 12 has a casing lid 21b including an externally threaded boss 21d which is threaded in an internally threaded surface of the attachment hole 13b. The electromagnetic actuator 12 is thus mounted on the upper coupling 13a of the bracket 13.

The housing 11a of the fuel injection pump 11 has an insertion hole 16 defined therein coaxially with the control rack 15. The plunger 17 of the electromagnetic actuator 12 extends through the insertion hole 16 in line with the control rack 15. The plunger 17 has a tip end engaging the control rack 15.

An engaging pin 18 is mounted on the end of the control rack 15 closer to the electromagnetic actuator 12. A first return spring 20 has one end retained by the engaging pin 18 and the other end retained by a pin (not shown) secured to an inner wall of the upper coupling 13a in the bracket 13. The first return spring 20 normally urges the control rack 15 in a direction (rightward in FIG. 1) to abut against the plunger 17. A connector 30 comprises a resilient U-shaped filamentary member having a U-shaped end engaging the engaging pin 18 and the other end engaging in a hole 17a (FIG. 2) defined in a tip end portion of the plunger 17. The connector 30 operatively interconnects the control rack 15 and the plunger 17 such that the control rack 15 and the plunger 17 are displaceable relatively to each other. Even if the first return spring 20 or a second return spring 26 (described later) fails, the connector 30 operates to return the control rack 15 to a position to stop the engine.

Figure 2:
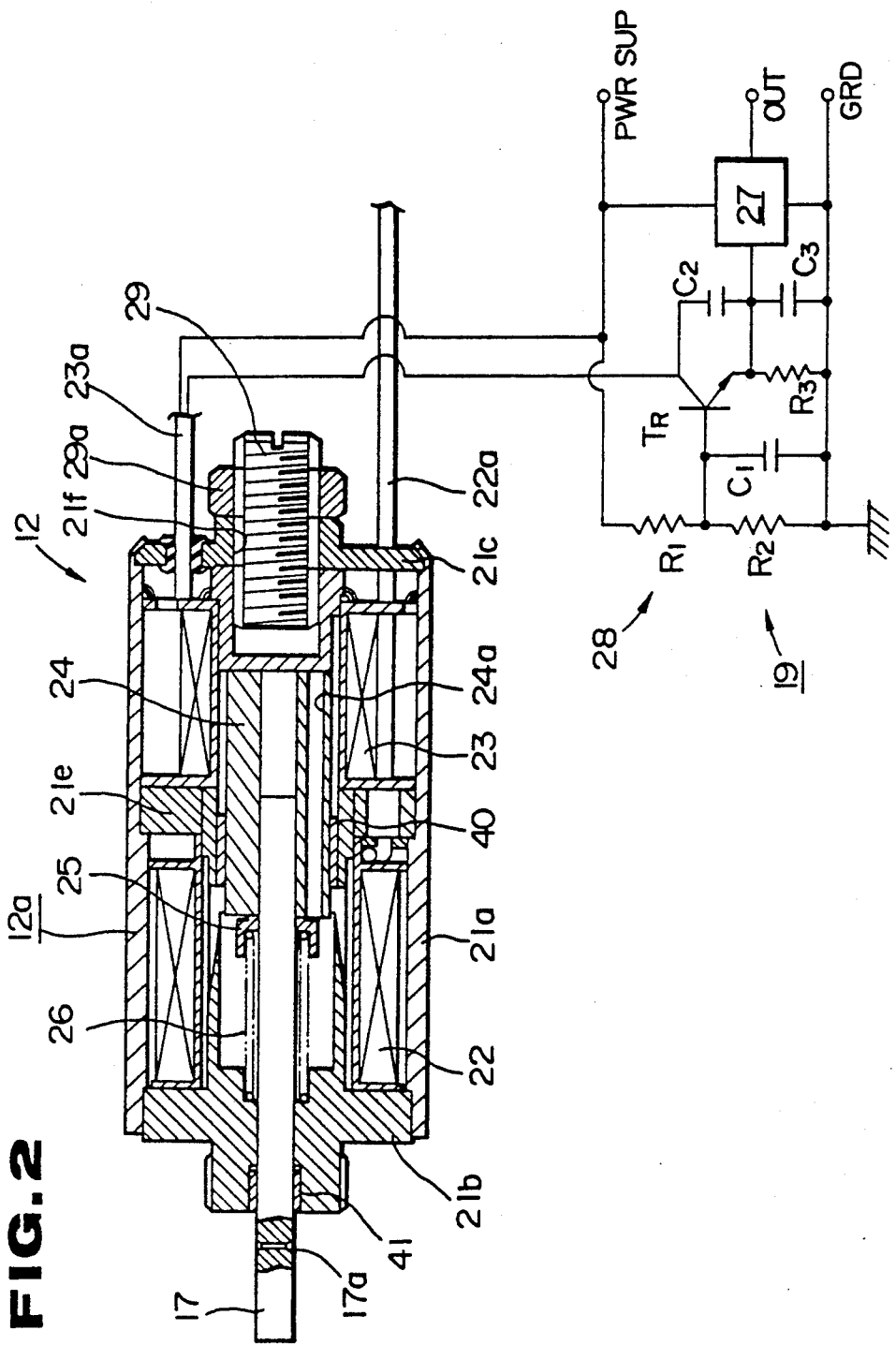
FIG. 2 is an enlarged cross-sectional view of the electromagnetic actuator, the view also showing an electric detecting circuit associated with the electromagnetic actuator.

As shown in greater detail in FIG. 2, the casing 12a of the electromagnetic actuator 12 comprises a cylindrical member 21a and a pair of lids 21b, 21c closing the openings at the opposite ends of the cylindrical member 21a. The plunger 17 is axially slidably supported by lid 21b through a bearing 41, and the tip end of the plunger 17 axially projects out of the casing 12a toward the control rack 15. The other end of the plunger 17, which is located in the casing 12a, supports a core 24 fixed thereto.

The casing 12a houses a drive coil 22 and a detection coil 23 which are disposed coaxially around the plunger 17 and juxtaposed in the axial direction of the plunger 17. When the drive coil 22 is energized by an electric current supplied thereto, the drive coil 22 generates a magnetic field depending on the supplied electric current, for bias-steting the core 24 to displace the plunger 17 in the axial direction. The detection coil 23 is axially spaced from the drive coil 22 with a partition 21e interposed therebetween. When the plunger 17 moves, the core 24 can enter the detection coil 23 on one side thereof across the partition 21e.

The core 24 is axially moved to displace the plunger 17 under magnetic forces produced by the drive coil 22. In the illustrated embodiment, when the drive coil 22 is energized, the core 24 and the plunger 17 are axially moved to the left (FIG. 2) under magnetic forces. Upon the axial displacement of the core 24, the length of the portion of the core 24 which is located within the detection coil 23 varies, thereby varying the inductance of the detection coil 23.

A retainer 25 is fixed to the lefthand end of the core 24 around the plunger 17. A second return spring 26 is disposed under compression between the retainer 25 and the lid 21b of the casing 12a. The second return spring 26 comprises a resilient coil spring for normally urging the plunger 17 to move in a direction (rightward in FIG. 2) away from the control rack 15.

The core 24 is slidably supported in the casing 12a by the bearing 41, and has a single oil passage 24a defined axially in a lower portion thereof for allowing lubricating oil filled in the casing 12a to flow therein.

An output adjustment core 29 is disposed along the axis of the detection coil 23 in coaxial relation to the plunger 17. The output adjustment core 29 has an externally threaded outer circumferential surface that is axially movably threaded in an internally threaded hole 21f defined centrally in the lid 21c. The output adjustment core 29 can be fixed in any desired axial position to the lid 21c by a lock nut 29a held against the lid 21c. The output adjustment core 29 has an axial end projecting into the casing 12a and positioned in the detection coil 23 on the other side thereof remote from the core 24. The inductance of the detection coil 23 is also variable depending on the length of the portion of the output adjustment core 29 which is positioned in the detection coil 23. Therefore, when the output adjustment core 29 is turned and hence axially moved to adjust the length of the portion thereof that is located within the detection coil 23, the frequency of the output from the detection coil 23 can be adjusted.

The drive coil 22 is electrically connected to a PWM driver circuit (not shown) through leads 22a, and the detection coil 23 is electrically connected to a detecting circuit 19 through leads 23a.

As shown in FIG. 2, the detecting circuit 19 comprises resistors R1, R2, R3, capacitors C1, C2, C3, a transistor TR, and a frequency-to-voltage converter (F/V converter) 27. The resistors R1, R2, R3, the capacitors C1, C2, C3, the transistor TR, and the detection coil 23 jointly constitute a Colpitts oscillator 28. The Colpitts oscillator 28 produces an output signal whose frequency depends on the electrostatic capacitances of the capacitors C1, C2, C3 and the inductance of the detection coil 23. Since the electrostatic capacitances of the capacitors C1, C2, C3 have fixed values, when the length of the portion of the core 24 which is located within the detection coil 23 varies, the inductance of the detection coil 23 also varies, thereby varying the frequency of an output alternating current from the detection coil 23.

The F/V converter 27 converts the frequency of the output from the Colpitts oscillator 28 into a corresponding voltage signal, which is applied as a detected signal representating the operating position of the plunger 17 to a fuel injection rate control device (not shown).

The oscillator 28 should not be limited to the illustrated Colpitts oscillator, but may be a Hartley oscillator. If a Hartley oscillator is employed, then the detection coil 23 serves as part of the inductor which determines the oscillation frequency of the LC oscillator.

In operation, an operating condition of the engine is detected by a sensor (not shown), and the drive coil 22 of the electromagnetic actuator 12 is energized by a direct current depending on the detected operating condition of the engine, thus imposing magnetic forces on the core 24. Under the imposed magnetic forces, the core 24 and hence the plunger 17 are axially displaced to actuate the control rack 15 of the fuel injection pump 11. At this time, the inductance of the detection coil 23 is varied by the axial displacement of the core 24 thereby varying the oscillation frequency of the Colpitts oscillator or LC oscillator 28. The F/V converter 27 produces a voltage signal depending on the oscillation frequency of the Colpitts oscillator 28. Based on the voltage signal, the interval that the plunger 17 has moved is detected for feedback control of the plunger 17.

Inasmuch as the displacement of the core 24 is detected as the voltage signal from the F/V converter 27 which corresponds to the oscillation frequency of the LC oscillator 28 with the detection coil 23 being an inductor thereof, the detected displacement is not adversely affected by the DC magnetic field generated by the drive coil 22. Therefore, even if the detection coil 23 and the drive coil 22 are positioned closely to each other, the detection coil 23 is not adversely affected by leakage fluxes from the drive coil 22. As a result, the detecting accuracy of the detection coil 23 remains high, and the electromagnetic actuator 12 may be small in size. The inductance of the detection coil 23 is quadratically proportional to the length of the portion of the core 24 which is located within the detection coil 23, and the oscillation frequency of the LC oscillator 28 is inversely proportional to the square root of the inductance of the detection coil 23. Therefore, the output voltage signal from the F/V converter 27 is substantially proportional to the axial displacement of the core 24.

When the output adjustment core 29 is turned about its own axis, it is moved in the axial direction of the plunger 17, varying the length of its portion located within the detection coil 23 and hence the inductance of the detection coil 23. Accordingly, the oscillation frequency of the LC oscillator 28 when the plunger 17 is in a reference position can be finely adjusted, i.e., the output voltage signal from the F/V converter 27 can be finely adjusted, simply by turning the output adjustment core 29, without adding a special electric circuit for such output adjustments. Since the output voltage signal can be adjusted by touching and turning only the output adjustment core 29, the output adjustment process is highly simple, and the adjusted output voltage signal is highly stable and reliable.

With the present invention, as described above, the core 24 serves to drive the plunger 17 and also to detect the position of the plunger 17, and the drive coil 22 and the detection coil 23 are positioned closely to each other, so that the electromagnetic actuator 12 may be simple in structure and small in size. The output voltage signal, indicative of the operating position of the plunger 17, can easily be adjusted by the simple output adjustment core 29, without the need for any special electric circuit for output adjustments.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. An electromagnetic actuator comprising:
   an axially movable plunger;
   a core mounted on one end of said plunger;
   a DC-exciting drive coil disposed around said core and plunger and energizable to displace said plunger axially under magnetic forces;
   a detection coil disposed closely to said drive coil coaxially therewith, for receiving said core therein on one side thereof in response to axial displacement of said plunger, whereby the inductance of said detection coil can vary depending on the length of a portion of said core which is positioned within said detection coil and said core serves not only to drive the plunger, but also in indicate the position of said plunger;
   an LC oscillator including an inductor and a capacitor, for producing an alternating current whose frequency is determined by the inductance of said inductor and the electrostatic capacitance of said capacitor, said detection coil being at least part of said inductor, whereby the oscillation frequency of said LC oscillator varies as the inductance of said detection coil varies; and
   a frequency-to-voltage converter for converting the frequency of an output signal from said LC oscillator into a corresponding DC voltage signal which is indicative of an operating position of said plunger.

2. An electromagnetic actuator according to claim 1, wherein said LC oscillator comprises a Colpitts oscillator, said detection coil serving as said inductor.

3. An electromagnetic actuator according to claim 1, further including an output adjustment core disposed on a side of said detection coil opposite to said one side and variable in position axially of said plunger so that the output adjustment core is positionable at least partly in said detection coil, whereby the inductance of said detection coil can vary depending on the length of a portion of said output adjustment core which is positioned within said detection coil.

4. An electromagnetic actuator according to claim 3, further including a casing having an internally threaded hole, said output adjustment core having an externally threaded surface and being threaded in said internally threaded hole, so that the length of the portion of said output adjustment core which is positioned within said detection coil can be adjusted by turning said output adjustment core about its own axis.

5. An actuator according to claim 1, wherein a portion of said core is received in said drive coil.

6. An electromagnetic actuator comprising:
   an axially movable plunger;
   a drive coil disposed around said plunger for axially displacing said plunger;
   a core mounted on said plunger;
   a detection coil disposed coaxially with said drive coil, for receiving said core therein on one side thereof in response to axial displacement of said plunger, whereby the inductance of said detection coil can vary depending on the length of a portion of said core which is positioned within said detection coil;
   an output adjustment core disposed on a side of said detection coil opposite to said one side and variable in position axially of said plunger so that the output adjustment core is positionable at least partly in said detection coil, whereby the inductance of said detection coil can vary depending on the length of a portion of said output adjustment core which is positioned within said detection coil;

an LC oscillator including an inductor and a capacitor, for producing an alternating current whose frequency is determined by the inductance of said inductor and the electrostatic capacitance of said capacitor, said detection coil being at least part of said inductor, whereby the oscillation frequency of said LC oscillator varies as the inductance of said detection coil varies; and a frequency-to-voltage converter for converting the frequency of an output signal from said LC oscillator into a corresponding DC voltage signal which is indicative of an operating position of said plunger.

7. An electromagnetic actuator according to claim 6, wherein said LC oscillator comprises a Colpitts oscillator, said detection coil serving as said inductor.

8. An electromagnetic actuator according to claim 6, further including a casing having an internally threaded hole, said output adjustment core having an externally threaded surface and being threaded in said internally threaded hole, so that the length of the portion of said output adjustment core which is positioned within said detection coil can be adjusted by turning said output adjustment core about its own axis.

9. An electromagnetic actuator according to claim 6, wherein said drive coil axially displaces said plunger under magnetic forces, said detection coil being disposed closely to said drive coil coaxially therewith.

10. An electromagnetic actuator comprising:
axially movable plunger means adapted to be connected to an external device;
means for electromagnetically driving said plunger means to control said external device; and
means for detecting a position of said plunger means;
said drive means including a DC-exciting drive coil disposed around said plunger means; and
said detecting means including:
a core mounted on one end of said plunger means for moving therewith;
a detection coil disposed closely to said drive coil coaxially therewith, said detection coil being adapted to receive said core therein at one side thereof in response to axial movements of said plunger means, and to generate an output signal indicative of a position of said plunger means;
oscillator circuit means for converting said output signal into a corresponding DC voltage signal;
said output signal corresponding to the inductance of said detection coil;
said inductance being variable in dependence on the length of a portion on said core which is positioned within said detection coil; and
said oscillator circuit means including an LC oscillator and a frequency-to-voltage converter.

11. An electromagnetic actuator according to claim 10, wherein said LC oscillator comprises a Colpitts oscillator.

12. An electromagnetic actuator according to claim 10, further including means for adjusting said output signal, said output adjustment means including an adjustment core disposed on a side of said detection coil opposite to said one side and variable in position axially of said plunger means such that said adjustment core is at least partly positionable in said detection coil.

13. An actuator according to claim 10, wherein said drive means further includes a portion of said core received in said drive coil.

* * * * *

UNITED STATES PATENT AND TRADEMARK OFFICE
CERTIFICATE OF CORRECTION

PATENT NO. : 5,172,298
DATED : December 15, 1992
INVENTOR(S) : Shimizu et al.

It is certified that error appears in the above-identified patent and that said Letters Patent is hereby corrected as shown below:

Column 3, line 41, after "by" insert --the--;

Column 3, line 52, change "bias-steting" to --biasing--.

Signed and Sealed this

Nineteenth Day of October, 1993

Attest:

BRUCE LEHMAN

Attesting Officer     Commissioner of Patents and Trademarks